April 28, 1964 L. H. CHARLOT, JR 3,131,314
TEMPERATURE CONTROL TRIGGER EMPLOYING EMITTER
RESISTOR HAVING VALUE OF TRANSISTOR'S
BASE-TO-EMITTER RESISTANCE
Filed Jan. 3, 1961 2 Sheets-Sheet 1

*INVENTOR.*
LINCOLN H. CHARLOT, JR.
BY Frank A. Steel
John W. Klooster
ATTORNEYS April 28, 1964    L. H. CHARLOT, JR    3,131,314
TEMPERATURE CONTROL TRIGGER EMPLOYING EMITTER
RESISTOR HAVING VALUE OF TRANSISTOR'S
BASE-TO-EMITTER RESISTANCE Filed Jan. 3, 1961    2 Sheets-Sheet 2

INVENTOR.
LINCOLN H. CHARLOT, JR.
BY Frank A. Steidl
John W. Klooster
ATTORNEYS in the United States Patent Office 3,131,314
Patented Apr. 28, 1964

3,131,314
TEMPERATURE CONTROL TRIGGER EMPLOYING EMITTER RESISTOR HAVING VALUE OF TRANSISTOR'S BASE-TO-EMITTER RESISTANCE
Lincoln H. Charlot, Jr., Saint Croix Beach, Minn., assignor to Minnesota Mining and Manufacturing Company, St. Paul, Minn., a corporation of Delaware
Filed Jan. 3, 1961, Ser. No. 80,062
4 Claims. (Cl. 307—88.5)

This invention relates to new and very useful semiconductor circuitry and more particularly to a semiconductor temperature limiter switch and the trigger circuit employed therein.

In the control of auto exhaust afterburners, or in any process where an off-on cycle is desired and it is necessary to detect and measure the control set point by use of a thermocouple for reasons of high temperature, it has heretofore been a great problem to obtain temperature control means which would not merely regulate temperature but would also possess high reliability under extreme operational and environmental conditions.

It is an object of this invention to provide a simple, economical, temperature control unit of small size.

It is an additional object of this invention to provide a temperature limiter switch which is environmental temperature stable and the sensing element for which can be operated under adverse corrosive conditions without affecting control reliability.

It is a further object of this invention to utilize a thermocouple sensing element in a semiconductor temperature limiter switch and cause the low power output characteristic of a thermocouple to directly activate a trigger.

It is another object of this invention to produce a temperature limiter switch constructed of semiconductor components which operates on an unregulated direct current.

It is still another object of this invention to provide a novel semiconductor trigger circuit of use in control devices.

These and other objects will become apparent from considering this specification and its attached drawings; wherein.

Figure 1:
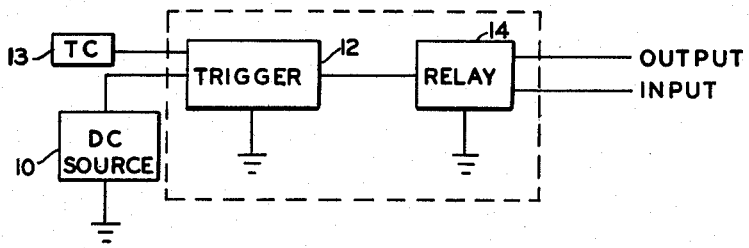
FIGURE 1 is a block diagram illustrating one embodiment of the invention wherein a thermocouple activated, direct current powered trigger employing the circuitry of the invention energizes a relay to provide an off-on cycle.

In FIGURE 1, a direct current source 10 furnishes power to trigger circuit 12 which is actuated by thermocouple 13. When trigger circuit 12 is actuated, it energizes relay 14. The power source can be any suitable 9.5 volt D.C. power supply.

Figure 2:
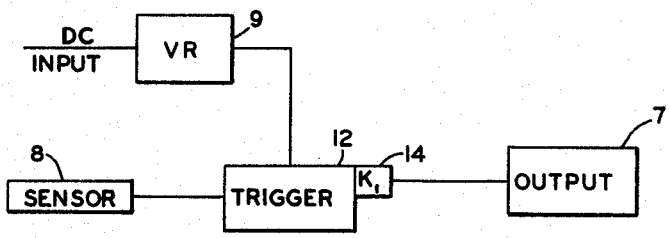
FIGURE 2 is a block diagram illustrating an embodiment of the invention wherein a trigger employing the circuitry of the invention is activated by a sensing element, such as a transducer, to provide an interrupted and controlled direct current output from an unregulated direct current power input.

In FIGURE 2, an unregulated direct current source (say, 11 to 15 volts) feeds voltage regulator 9 which supplies uniform voltage (say, 9.5 volts) to trigger 12. Electrical energy from sensing element 8 actuates trigger 12, which then energizes relay switch 14, thereby providing the output power 7, whose voltage is equal to the supply voltage and is produced when the contacts (not shown) of switch 14 are closed.

Figure 3:
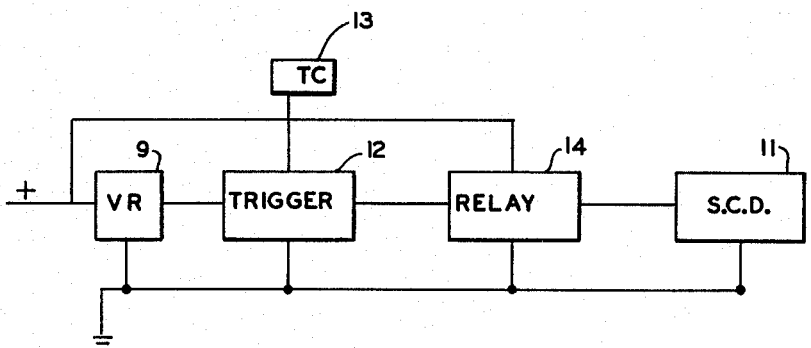
FIGURE 3 is a block diagram illustrating an embodiment of the invention wherein a thermocouple activated, direct current powered trigger employing the circuitry of the invention uses regulated direct current input to provide control through a relay for a system control device.

In FIGURE 3, a voltage regulator 9 furnishes regulated voltage for the trigger 12, here actuated by thermocouple 13. Trigger circuit 12 energizes relay 14 so that output power is obtained to operate system control device 11, such as an electropneumatic valve.

Figure 4:
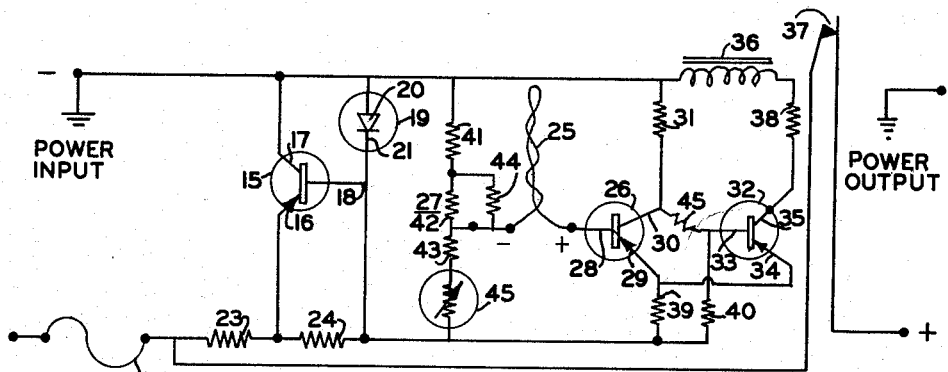
FIGURE 4 is a complete schematic of a circuit utilizing the invention.

In the particular embodiment disclosed in FIGURE 4, a PNP-type transistor 15, having an emitter 16, a collector 17, and a base 18, is connected in a grounded collector configuration. In this embodiment, which is suitable for operation from a modern conventional automobile electrical system (i.e. about 11 to 15 volts D.C.), transistor 15 and a Zener diode 19 form a voltage control circuit, together with associated resistances 23 and 24. The Zener diode is a conventional silicon diode voltage reference device with the breakdown reverse-voltage characteristic known to the art as the Zener voltage region.

Here, Zener diode 19 is chosen to have its breakdown reverse-voltage characteristic fall below the lower power supply input voltage. In this embodiment, breakdown-voltage ratings of the diode are below about 10 volts. The particular diode used in this embodiment should be capable of controlling the stability of the regulator circuit within about 1 percent over the temperature range of 10 to 60° C. (i.e. a conventional Zener diode is used).

Transistor 15, Zener diode 19, and associated resistors 23 and 24 of FIG. 4 are part of the voltage regulator circuit of the complete schematic shown. Transistor 15 and Zener diode 19 are chosen so as to furnish a regulated 9.5 volts to the rest of the circuit from the normally varying voltage of a so-called 12 volt automobile electrical system. Thus, the collector 17 of transistor 15 and the anode 20 of diode 19 are both grounded. Source voltage, after being dropped by, say, a 50 ohm resistor 23, is connected to the emitter 16 of transistor 15. After a further slight drop through resistor 24 (say about 3.9 ohms), the source voltage is connected with the base 18 of transistor 15 and the cathode 21 of Zener diode 19.

Temperature control is achieved by applying the output of the temperature sensing thermocouple 25 to the base 28 of PNP junction transistor 26 which is biased to above cutoff by the biasing network 27, this network being composed of resistors 41, 42, 43 and 44. As the output of the thermocouple increases with increasing temperature, cutoff is reached and transistor 26 stops conducting normally (via collector 30 and emitter 29), which causes a reduced voltage drop across collector resistor 31 (about 1500 ohms, say) of transistor 26, thus increasing the voltage on base 33 of PNP junction transistor 32 which increases the bias on base 33 of transistor 32. This bias value is adjusted to the correct operating range by resistors 40 and 46 and an increase in bias causes an increase in current passing through transistor 32 (via collector 35 and emitter 34) so that the relay 36 becomes activated to the point where it opens switch 37 which in turn activates, say, a solenoid valve, thus interrupting the air supply to, say, an automobile exhaust gas afterburner, reducing the combustion therein, which results in lowering the temperature inside the afterburner. This provides the desired regulator action.

Thermistor 45 is a conventional temperature sensitive resistor which compensates for changes in circuit constants due to ambient changes. These changes can arise from various sources such as thermocouple cold junction drift, transistor parameter change, resistor resistance change, or even voltage regulator output. In the circuit of FIG. 4, a thermistor 45 (commercially available) is installed in the base-bias circuit of PNP junction transistor 26 to provide constant sensitivity over a wide ambient temperature range (i.e. say 10 to 60° C.) and to balance out ambient temperature changes in circuit constants. Preferably it is of the self-calibrating type.

Figure 5:
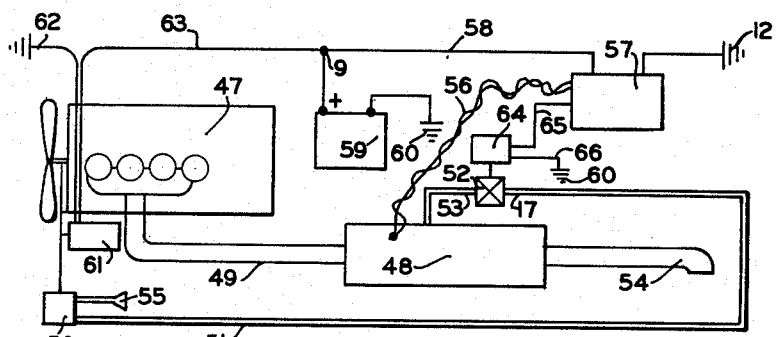
FIGURE 5 is a diagram illustrating how the preferred embodiment of FIGURE 4 is used in combination with a vehicular internal combustion engine to provide temperature control of an associated exhaust gas afterburner.

FIGURE 5 is an illustration showing employment of the temperature limiter switch of FIG. 4 to control temperature of an auto exhaust afterburner device employed on an automobile engine to diminish the amount of smog causing constituents of automobile exhaust gas. The automobile engine 47 produces exhaust gas containing certain smog causing constituents from the combustion of fuel and air. The exhaust gas is transported to exhaust gas afterburner 48 through connective pipe 49 where it is combusted by one of several known methods. Air is supplied by air pump 50 which is connected to and powered by engine 47, for example, through a rubber V-belt drive, or through an electric motor energized by the car's electrical system, or other suitable means.

Thus, in FIGURE 5, the automobile engine exhaust gas is transported from the automobile engine 47, through the connective piping 49, through the exhaust gas afterburner 48, where it is combusted, for example, directly with air. Thereafter, the harmless gas is passed on to the atmosphere through pipe 54. The air passes through connective piping 51 to normally closed electrically operated solenoid valve 52, and on through connective piping 53 to the auto exhaust gas afterburner 48. The temperature condition of the automobile exhaust gas afterburner is sensed by thermocouple 56 of temperature limiter switch 57.

The circuit of the temperature limiter switch consists of a wire conductor 58 which supplies electrical power from battery 59 connected to ground 60 (frame of car). The battery 59 is charged by generator 61 through conductors 62 and 63. The temperature limiter switch 57 is connected to the solenoid 64 of the electrically operated solenoid valve 52 through conductors 65 and 66.

If the temperature set point of the temperature limiter switch 57 is exceeded in the automobile exhaust gas afterburner 48 as sensed by the sensing thermocouple 56, then the flow of current to the solenoid 64 of the normally closed solenoid valve 52 is interrupted thus deactivating the solenoid 64, and allowing the valve 52 to close. The combustion in the automobile exhaust gas afterburner is thereby reduced, resulting in a lowering of operating temperature. As the operating temperature declines, the temperature sensing thermocouple 56 relates this to the temperature limiter switch 57, thus allowing it to restore current to the solenoid 64, thereby opening the valve 52, readmitting air to the automobile exhaust gas afterburner which restores normal operation. The temperature limiter switch 57 therefore is useful in protecting the structural integrity of the automobile exhaust gas afterburner 48 by maintaining its operating temperature below temperatures which would deleteriously affect the afterburner.

In the semiconductor temperature limiter switch embodiment of FIGURES 4 and 5, the thermocouple directly activates the trigger which in turn directly activates the relay. A change in the thermocouple output of about 1 millivolt and 0.01 milliamp, or in the order of .001 microwatt will cause the trigger to switch the relay for which a 60 milliwatt change is required. Thus, .001 microwatt is used to switch a 60 milliwatt relay which represents a very considerable gain or amplification of the thermocouple power (a power gain in the order of 1,000,000).

As those skilled in the art will appreciate, a wide variety of components can be used or substituted for those described above, with the usual conventional changes in circuitry construction. For example, one can substitute NPN for PNP transistors. Similarly, other D.C. sources can be employed as sensors to operate the device besides thermocouples, such as, for instance, thermistors, transducers, transistors, and the like. Similarly, other regulated voltages can be used to operate the circuit (i.e. other than 9.5 volts).

An important part of this invention is the trigger circuit 12. It accepts a low power input and produces a relatively high power output. This trigger contains two transistor stages, employs a very low input impedance (lower than normally associated with semiconductor circuitry, say below about 10 ohms impedance), and has exceptional stability. Such low input impedance and exceptional stability are produced as the highly unexpected result of using a low ohmage resistor common to the emitter circuits of both transistor stages. This resistor, numbered 39 in the embodiment of FIG. 4, has a resistance value in ohms not greater than that associated with the base to emitter junction resistance of the transistor in the first of the two stages (i.e. the stage containing the transistor whose base is directly connected to the sensing element or sensor).

It is theorized that the low value of resistance 39 common to both emitter circuits gives the trigger its surprising characteristically low input impedance. Furthermore, this low value resistor, through which the emitter 29 of transistor 26 and emitter 34 of transistor 32 are connected to the terminal of the power supply, is the surprising overall effect of exceptional stability and sensitivity, presumably by allowing a relatively larger current flow through such resistor during the switching or conducting condition than during the primary or nonconducting condition. This has the net effect of clamping the circuit in the conducting configuration. This effect is known to the art as positive feedback. The exact value of this low resistance in any given circuit determines the amount of feedback provided. By varying the value of this resistance, the switching lag or bandwidth can be changed or controlled, as desired.

It is known in the art that small signal driven trigger circuits are unstable due to the relatively low ratio of signal to noise. Therefore, it is very surprising that the trigger circuit of this invention will provide stable operation on such an extremely small signal (in the order of 0.01 microwatt).

Figure 6:
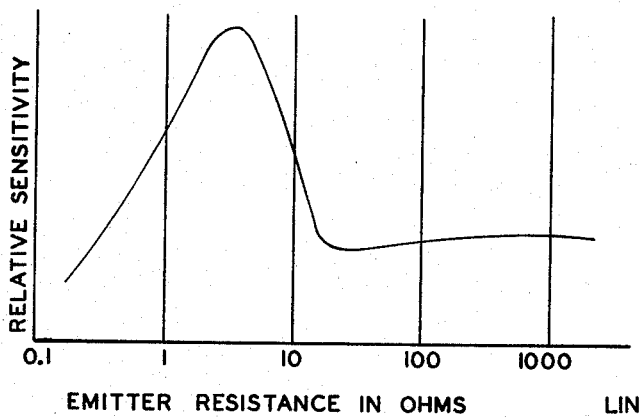
FIGURE 6 is a graph showing the relationship between the relative sensitivity of the trigger circuit of this invention and the resistance in ohms of the special community emitter resistance employed in such circuit.

FIGURE 6 graphically illustrates the relationship between the relative sensitivity to sensor change of the trigger circuit, and the value of resistance 39. As is shown, a certain value of resistance for resistor 39 is required to obtain maximum sensitivity to detect sensor change. By bandwidth it is here meant the amount of sensor change required to restore the switch to its original or first condition. This absolute value is relative to the circuit component parameters. In the present embodiment of FIGURE 4 this resistance 39 has a value under 10 ohms.

A trigger biasing network which provides the necessary base control bias current for the first transistor stage of the trigger circuit is employed. This network gives the necessary compensation to balance the effects of the change of ambient temperature upon the associated components of the first stage circuitry. In general, it provides a means for adjusting the sensor setpoint of the semiconductor control device of this invention, the sensor setpoint being that point at which a change in control action is initiated by the electrical output of the particular sensor device employed.

In the embodiment of FIG. 4, the trigger biasing network consists of: (a) a biasing network compensating for the type and change in a sensor; (b) a thermistor for ambient temperature change compensation.

The biasing network for switch point control provides the base biasing current for the first transistor stage of the trigger circuit. The limiting resistor admits the necessary current to the base biasing network. The tracking resistor is used with the thermistor to provide the compensation needed to match that net change produced by changing ambient temperature upon the temperature sensitive components in the first stage, which includes the sensing elements and first stage circuitry components.

While the circuitry and arrangements shown and described in this specification are largely of the preferred embodiment, applicant does not wish to be limited to this particular configuration. Numerous and varied other arrangements within the spirit and scope of the principles of this invention will readily occur to those skilled in the art. The foregoing description by no means exhaustively covers all applications of this invention.

What is claimed is:

1. A temperature control switch comprising, in combination, a trigger circuit containing a first transistor stage and associated circuitry and a second transistor stage and associated circuitry, the transistor of said first stage and the transistor of said second stage having a resistor common to the emitter circuits of both transistors, said resistor having a resistance value not greater than the base to emitter junction resistance of the said first stage transistor; biasing means for adjusting the sensor setpoint of said trigger circuit to a value outside the conductive condition of the said circuit, said biasing means including means to compensate for change in ambient temperature of the said circuit; a sensor operatively associated with said circuit and supplying to the base of said first stage transistor a voltage in response to changes in ambient conditions surrounding the said sensor, for triggering said circuit to cause current flow; and a source of direct current for energizing the said circuit.

2. A temperature control switch comprising, in combination, a trigger circuit containing a first transistor stage and associated circuitry and a second transistor stage and associated circuitry, the transistor of said first stage and the transistor of said second stage having a resistor common to the emitter circuits of both transistors, said resistor having a resistance value not greater than the base to emitter junction resistance of the said first stage transistor; biasing means for adjusting the sensor setpoint of said trigger circuit to a value below the conductive condition of the said circuit, said biasing means containing means including a thermistor to compensate for changes in ambient temperature of the said circuit; a thermocouple operatively associated with said circuit for supplying to the base of said first stage transistor a voltage in response to changes in ambient temperature conditions surrounding the said thermocouple for triggering said circuit to cause current flow; and a source of direct current for energizing the said circuit.

3. In a semiconductor-operated temperature control switch, a trigger circuit containing a first transistor stage and associated circuitry and a second transistor stage and associated circuitry, the transistor of said first stage and the transistor of said second stage having a resistor common to the emitter circuits of both transistors, said resistor having a resistance value not greater than the base to emitter junction resistance of the said first stage transistor.

4. A circuit according to claim 3, in which the said common resistor has a resistance not greater than about 10 ohms.

References Cited in the file of this patent

UNITED STATES PATENTS

| | | |
|---|---|---|
| 2,757,286 | Wanless | July 31, 1956 |
| 2,848,658 | Mitchell | Aug. 19, 1958 |
| 2,887,591 | Young | May 19, 1959 |
| 2,939,018 | Faulkner | May 31, 1960 |
| 2,954,479 | Cibeluis | Sept. 27, 1960 |
| 2,981,296 | Paul | Apr. 15, 1961 |